Sept. 30, 1958 S. LUBKIN ET AL 2,854,198

MAGNETIC TAPE DRIVE MECHANISM

Filed Nov. 10, 1955 2 Sheets-Sheet 1

INVENTOR.
SAMUEL LUBKIN
LEON ROBERT MOCK

BY Jesse A. Holton

ATTORNEY

Sept. 30, 1958 S. LUBKIN ET AL 2,854,198

MAGNETIC TAPE DRIVE MECHANISM

Filed Nov. 10, 1955 2 Sheets-Sheet 2

INVENTOR.
SAMUEL LUBKIN
LEON ROBERT MOCK

BY Jesse A. Holton

ATTORNEY

United States Patent Office 2,854,198

Patented Sept. 30, 1958

2,854,198

MAGNETIC TAPE DRIVE MECHANISM

Samuel Lubkin, Bayside, and Leon Robert Mock, Glen Cove, N. Y., assignors to Underwood Corporation, New York, N. Y., a corporation of Delaware Application November 10, 1955, Serial No. 546,137

3 Claims. (Cl. 242—55.12)

This application relates to a driving mechanism for winding and unwinding a magnetic tape in a tape reading mechanism and more particularly to the take-up and delivery drives for the reels of magnetic tape.

Bi-directional drives for the magnetic tape reels of a tape sensing device are well known but are very expensive due to the complexity of the controls used and the cost of the component parts. Known devices, for example, have used reversible, variable speed electric motors and photoelectric controls therefor to drive the tape reels resulting in a complex system using specialized components. Another known type of drive uses a kind of vacuum sensing of the tape position and an intermittently operated clutch controlled thereby to drive the tape reel to either supply or to take up the tape during a tape reading operation.

It is an object of the present invention to devise a bi-directional variable speed drive for a tape reel which drive shall be wholly mechanical and thus not subject to the failures common to electrical components.

It is another object to provide such a device which may be driven by an inexpensive, unidirectional, induction type motor.

A further object is to develop a device capable of variable speed in either direction using components which are commercially available at low cost or which may be easily manufactured.

Still another object is to develop a control device for such a drive which control is sensitive to slight changes in tape length and is reliable.

A still further object is to provide a tape reel driving mechanism which is sturdy and stable, requiring no service over substantial periods and yet is sensitive to slight variations in control conditions.

Other objects will be in part pointed out and in part obvious in the following detailed description of a preferred embodiment of my invention.

In the accompanying drawings;

Figure 1 is a front view of a complete sensing device for a magnetic tape showing the tape reading section and two reels for storing the tape, Figure 2 is a rear view showing the drive mechanism for moving a tape past a reading device, Figure 3 is a top view of the bi-directional drive for one of the tape reels, Figure 4 is a side view of the drive of Figure 3, Figure 5 is a detail plan view showing the end of tape reel arresting mechanism, and Figure 6 is an exploded perspective view showing the reel mechanism for arresting the reel when the tape supply is exhausted.

*General description*

Broadly, the present disclosure relates to a tape handling mechanism wherein a tape, preferably of plastic or metal coated with a thin layer of magnetizable material, although any other type of recording on a tape may be used, is stored on a reel. The tape is withdrawn from the reel over a reading device which reads off the information which has been recorded on the tape and the tape is then passed to another reel upon which it is rewound. These mechanisms are operable in a reverse direction to restore the tape to its original reel or to enable rereading of a section of the tape.

Between the tape reading device and each reel is a temporary storage section which holds a small length of tape to supply the reading heads with tape as soon as reading is started and to obviate the need for the reading mechanism to pull the tape off of the supply reel. Each temporary storage section is connected to the drive mechanism for its reel so that when tape is withdrawn from the temporary storage, the reel drive will be engaged to supply more tape to storage and conversely, if tape is supplied to storage, the reel drive is engaged to withdraw tape from that storage.

The speed of the drive of a reel is controlled by the storage section so that during reading operations, a substantially constant length of tape is held in each storage. After the drive for the tape reading section has stopped, the storage sensing part continues the drive to the tape reels to supply to or take from the storage section enough tape to bring the storage to a neutral position which cuts off the reel drive.

Each reel is driven by a reversible friction drive which is controlled by the temporary tape storage device so as to maintain the amount of stored tape within upper and lower limits. The friction drive is rendered effective to drive the reel in a direction to restore the storage device to a normal position and at a speed which varies with the deficiency or excess of the tape actually in temporary storage. The limits of amount of storage are set so that if the tape stored is exhausted or exceeds the storage capacity, the tape drive mechanism is shut off.

In addition, there is an automatic reel arresting device which arrests the reel before tape is completely removed therefrom thus avoiding the possibility of having a tape unwound completely from a reel.

*Detailed description*

Figures 1, 2:
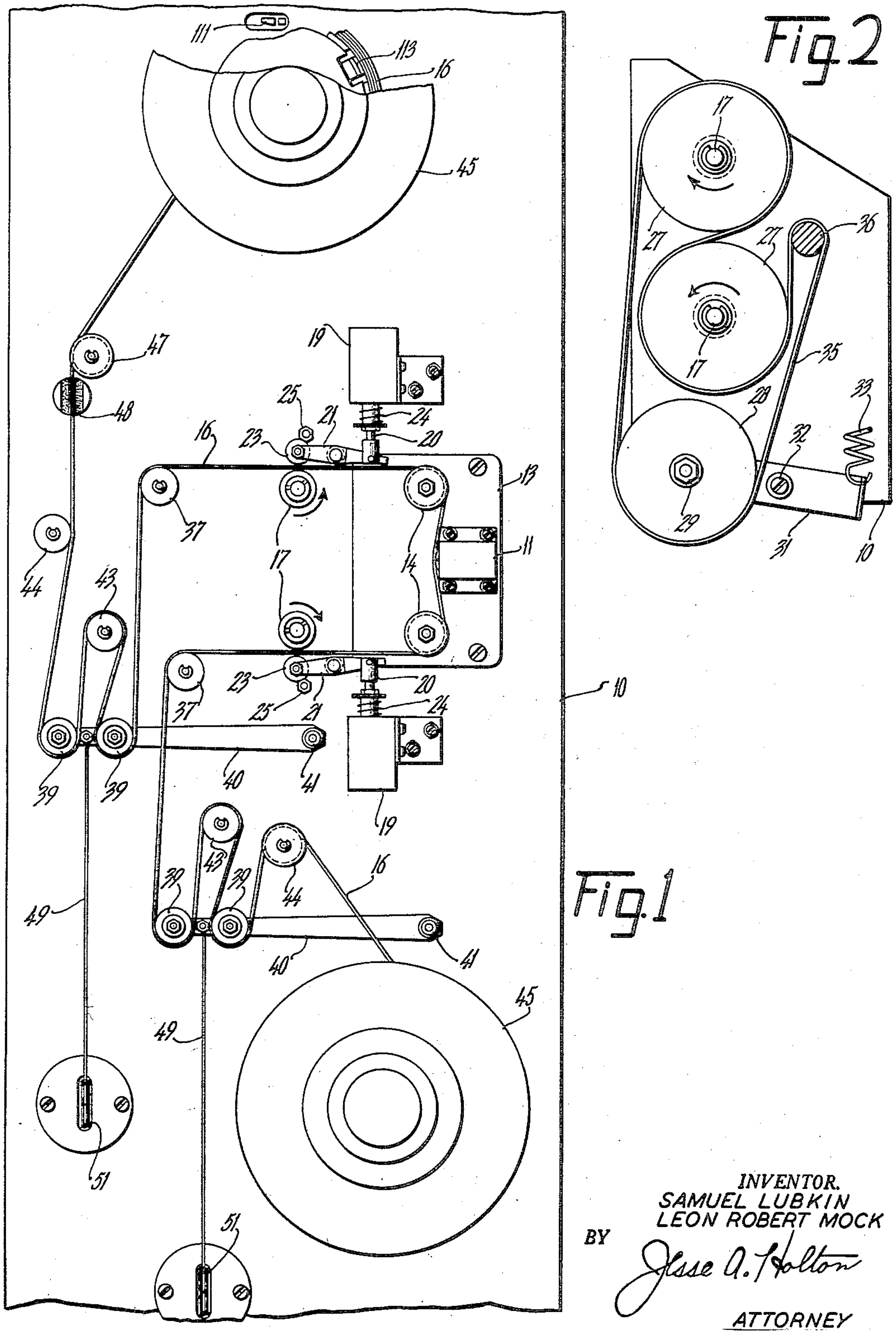

Referring to Figure 1, the tape drive mechanism is mounted on a panel 10 which may be of any suitable material as slate, Bakelite, etc. At the right center of panel 10 is a tape reading head 11 fixed to a plate 13 which also carries two idler rollers 14 rotatable thereon. Head 11 may be any of the commercially available devices which function to sense the magnetized spots or other type of record on the tape passing the head and to give an electrical output corresponding to the record.

The record tape 16 may be drawn across head 11 either upwardly or downwardly by two reversely rotating capstans 17. Tape 16 may be engaged with either capstan 17 under remote control by solenoids 19, one for each capstan 17, the armature 20 of each solenoid 19 acting through a lever 21 to drive a roller 23 toward its capstan 17 and force the tape 16 into driving engagement therewith. A spring 24 around each armature 20 urges the levers 21, when the solenoid 19 is deenergized, to hold rollers 23 against stops 25 and clear of the tape 16.

The capstans 17 are driven in opposite directions as indicated by the arrows in Figure 1 by the driving mechanism shown in Figure 2, which mechanism is on the rear side of panel 10. As shown, there is a pulley 27 fixed to each capstan 17. An idler pulley 28 rotatable on a stud 29 fixed in a lever 31 lies below the two pulleys 27. Lever 31 is pivoted on a fixed stud 32 and is tensioned counterclockwise by a spring 33 to tension a belt 35 wound around pulleys 27 and 28 as shown in Figure 2 and around a driving shaft 36 which may be the shaft of a constant speed motor.

Referring again to Figure 1, after tape 16 leaves a capstan 17, it passes over a fixed idler roller 37, thence downwardly around one of a pair of pulleys 39 rotatable on an arm 40 pivoted on a stud 41 on panel 10, then upwardly over an idler 43, down over the other pulley 39 on arm 40 and to another idler 44. From the lower idler 44 the tape 16 is wound on or supplied from a reel 45. The upper end of tape 16 is also stored on a reel 45 but passes from reel 45 to an idler pulley 47 and through a clamp 48 before it reaches the idler 44. Clamp 48 is normally ineffective and clamps tape 16 only when the driving power of the tape drive is turned off to prevent loss of a tape leader fixed to the lower reel 45 while the upper reel 45 is being changed.

Each arm 40 with pulleys 39 and idlers 37 and 43 constitutes a temporary tape storage section and when tape 16 is engaged with one of the capstans 17 to drive the tape, tape 16 will be withdrawn from one storage section and supplied to the other section. When tape is taken from a section, its arm 40 moves clockwise and when tape is supplied to a section, its arm 40 drops counterclockwise, both from a normal horizontal position. The movement of an arm 40 from neutral is utilized to engage a drive mechanism for the reel 45 immediately feeding tape to or from that arm 40. The reel drive mechanism is bi-directional and will be engaged to drive reel 45 so as to return arm 40 to the neutral position. The drive mechanism is also variable in its speed and is speed-controlled by the amount of rotation of arm 40 from its neutral position. Each arm 40 is connected by a cord or wire 49 at its outer end to a reel drive mechanism with the cord 49 passing down around a pulley 51 in panel 10 and up the back of the panel 10 to the reel drive mechanism.

Figures 3, 4, 5, 6:
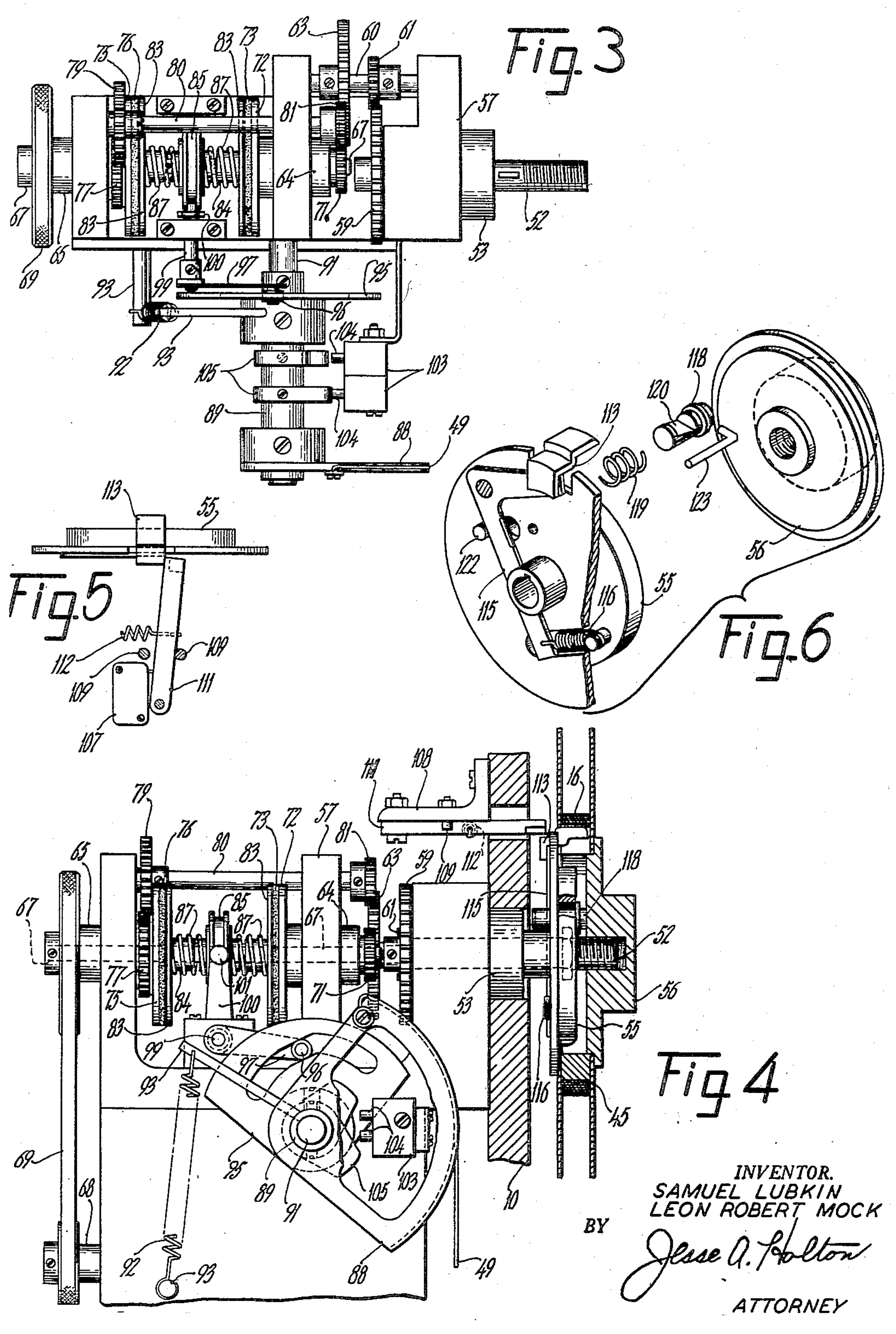

The drive mechanisms for the two reels 45 are the same and are as shown in Figures 3 and 4. The reel 45 is detachably secured to a spindle 52 rotatable in a bearing 53 in panel 10 and having a reel mount 55, Figure 4, secured thereto. The reel is slipped over the reduced diameter part of mount 55 to abut the back flange and a flanged knob 56 is screwed on to the outer end of spindle 52 to retain reel 45 on the mount 55. The inner end of spindle 52 passes through a hole in a bracket 57 secured to the back face of panel 10 and carries a gear 59. A jack shaft 60, Figure 3, rotatable in bracket 57, carries a pair of gears 61 and 63 secured to it with the smaller gear 61 meshing with gear 59.

Also rotatable in a pair of sleeves 64 and 65 rotatable in bracket 57 is a main drive shaft 67 concentric with spindle 52 and continuously driven, preferably by a motor shaft 68 through belt 69. Sleeve 64 has a gear 71 secured to its panel end which gear 71 engages gear 63 on the jack shaft 60 and the sleeve is secured at its inner end to a disc 72 carrying a suitable friction coating 73. Sleeve 65 has a similar disc 75 with a friction coating 76 secured on the panel end of the sleeve and carries a gear 77. Gear 77 meshes with a gear 79 fixed on a shaft 80 rotatable in bracket 57 and carrying a gear 81 on its panel end, gear 81 also meshing with gear 63.

Adjacent each friction coating 73 and 76 is a pressure plate 83 secured to a sleeve 84 splined on shaft 67 for sliding movement thereon. Intermediate the two sleeves 84 is a collar 85 also splined on shaft 67 for sliding movement. A spring 87 between each pressure plate 83 and collar 85 serves, with collar 85 in a central position, to urge each plate 83 into light engagement with its adjacent friction coating 73 or 76. A movement of collar 85 toward one of the plates 83 will, through spring 87, increase the pressure of that plate 83 against its friction coating 73 or 76 and decrease the pressure of the other plate 83 so that the plate 83 having the greater pressure will drive the associated disc 72 or 75 which through gears 63, 61, and 59 will drive the reel spindle 52. Due to the interposition of idler shaft 80 with its gears 79 and 81 between sleeve 65 and gear 63, sleeve 65 when driven will rotate spindle 52 in the opposite direction than will sleeve 64 when it is driven, thus giving a reversal of drive depending upon movement of collar 85. Furthermore, the pressure applied between plate 83 and its adjacent friction coating will depend upon the distance collar 85 is moved from the central position thus enabling a control over the torque applied to the reel and permitting a variable speed of rotation of the reel in either direction.

The movement of collar 85 to control direction and speed of reel rotation is controlled by the movement of arm 40 of the associated intermediate section so that the reel 45 will be driven to take up or supply tape to arm 40 to return it to its central position. This control is effected through cord 49 fixed to arm 40, see Figures 1 and 4, which cord is at its other end held in a groove in the rim of a quadrant 88. Quadrant 88 is secured to a sleeve 89 rotatable on a stub shaft 91 fixed in bracket 57 and is tensioned counterclockwise in Figure 4 by a spring 92 connected between a post 93 on sleeve 89 and a post 93 secured in frame 57.

Also secured to sleeve 89 is a cam 95 having two concentric slots of different radii connected by a sloping slot. A follower roller 96 on an arm 97 of a shaft 99 pivoted in bracket 57 is engaged in the slot of cam 95. A second arm 100 secured vertically on the other end of shaft 99 carries a stud 101 which engages in a peripheral groove of collar 85. When arm 40 is in its central position, the quadrant 88 and cam 95 are so positioned that roller 96 is in the central part of the sloping slot of cam 95 and collar 85 is held in its central position. A movement of arm 40 in either direction away from its normal position will, through cord 49, rock quadrant 88 and cam 95 to move roller 96 in the cam slot and shift collar 85 away from its central position, thereby engaging the drive to rotate the reel 45 in the direction required to restore arm 40 to neutral at which point the drive is restored to the normal condition.

If the tape should break at any point or if it should be exhausted from a reel 45 and the tape 16 become taut due to the attachment of its end to a reel, the arm 40 will drop in the first instance or be pulled upwardly by the drive from a captan 17 in the second instance to the limit of its movement. As a safety measure to prevent further tape drive from the capstans 17 and to the reels 45, a pair of switches 103 are supported on a portion of bracket 57 with contact operating buttons 104 of each switch positioned to be operated by the aligned one of a pair of cams 105 secured to sleeve 89 when arm 40 reaches its limit of movement in either direction. These switches 103 when operated may sound an alarm, shut off the power to the driving motors or give some other indication to an operator that attention is required. Clearly, if no indication of the particular limit, upper or lower, which has been reached is required, one switch 103 with a double lobed cam 105 to indicate when either the upper or lower limit of arm 40 is reached will be sufficient.

A further safety device to prevent complete unwinding of the last turn of tape 16 from a reel 45 and to give a further indication that all of the recorded part of a tape has been unwound from a reel is shown in Figures 4, 5 and 6. In this device, a switch 107 is mounted on a bracket 108 secured to the rear of panel 10. Pivoted at the rear end of bracket 108 and movable between two stop pins 109 is an arm 111 having its forward end projecting through a hole in panel 10. A spring 112, Figure 5, tensions arm 111 counterclockwise to engage the operating button of switch 107. Arm 111 is moved clockwise against the right hand stop pin 109 by an abutment 113 on the reel mount 55 which abutment is freed to move into an engaging position with respect to arm 111 when the last turn of tape is being unwound from a reel 45. The abutment 113 is fixed to a bell crank 115, Figure 6, pivoted on the panel side of the reel mount 55 with a spring 116 between bell crank 115 and mount 55 urging bell crank 115 counterclockwise in Figure 6 to position the abutment 113 in position to engage arm 111, Figure 5.

Normally, abutment 113 is held below the arm engaging position by the tape 16 on reel 45. As shown in Figure 4, the forward end of abutment 113 passes through a hole in reel 45 and is urged by spring 116 against the tape 16. When the last layer of tape 16 is withdrawn from reel 45, spring 116 moves the abutment 113 outwardly into position for engagement with arm 111 during further rotation of reel 45 and positively arrests further tape withdrawal from the reel.

As it is desirable that the abutment 113 be retracted if no reel 45 is on reel mount 55, thus enabling easy insertion of a new reel on the mount 55, a cam plunger 118 is mounted in a hole in reel mount 55 and is urged outwardly by a spring 119. In its outward position, a beveled surface 120 on plunger 118 engages the arm of bell crank 115 and rocks it clockwise, Figure 6, against a stop pin 122 to hold abutment 113 in a retracted position. Arm 115 cannot rock far enough in the clockwise position to permit plunger 118 to pass by arm 115 and fall out of the reel mount 55. A wire 123 passing through holes in plunger 118 and mount 55 prevents rotation of the plunger 118 but does not affect its reciprocation.

Plunger 118 is pushed inwardly to free bell crank 115 for control from the tape 16 by the reel knob 56 which engages the front end of plunger 118 to push the plunger in as the knob 56 is screwed on to spindle 52. The inward movement of plunger 118 frees bell crank 115 to move into notch 120 and press abutment 113 against the tape 16 on reel 45.

It will thus be seen that the above tape reading mechanism enables a record tape to be driven at a constant speed from an intermediate storage device past a record reading head and into another temporary storage device together with two tape storage reels, each reel being driven under control of its associated temporary storage device, in a direction and at a speed proportioned to the need to restore its temporary storage device to a normal capacity.

It may be pointed out that the function of the head 11 need not be restricted solely to tape sensing for head 11 may also, as is common in the magnetic recording art, be utilized to record signals on the tape 16.

The above description of a preferred embodiment of my invention is not to be taken in a limiting sense as substantial variations are possible without departure from the scope of the invention as set forth in the following claims.

What is claimed is:

1. In a record handling machine of the class described, the combination of a pair of record material reels, a record sensing or recording device between said reels, means to move record material past said device in either of two directions, a variable speed reversible drive mechanism for each of said reels and means to arrest rotation of a reel in the record material feeding direction comprising a stop member, a movable abutment on said reel, and means urging said abutment into a stop member engaging position, said abutment being retained in a non-engaging position by the record material on said reel.

2. In a record handling machine of the class described, the combination of a pair of record material reels, a record sensing or recording device between said reels, means to move record material past said device in either of two directions, a variable speed reversible drive mechanism for each of said reels and means to arrest rotation of a reel in the record material feeding direction comprising an abutment on said reel, means urging said abutment against the record material on said reel, a spring-urged pivotable stop member, a pair of limiting members adjacent said stop member and a switch, said abutment being freed when the record material is removed from said reel for movement into position to engage said stop member during rotation of said reel to operate said switch and be yieldably arrested by one of said limiting members.

3. In a record handling machine of the class described, the combination of a pair of record material reels, a record sensing or recording device between said reels, means to move record material past said device in either of two directions, a variable speed reversible drive mechanism for each of said reels and means to arrest rotation of a reel in the record material feeding direction comprising a pivoted stop arm, an abutment on said reel and normally held by the record material on said reel out of position to engage said pivoted stop arm, and means to move said abutment into position to engage said pivoted stop arm when the record material is substantially exhausted from said reel.

References Cited in the file of this patent

UNITED STATES PATENTS

| | | |
|---|---|---|
| 2,525,995 | Barbara et al. | Oct. 17, 1950 |
| 2,609,998 | Sear | Sept. 9, 1952 |
| 2,656,129 | De Turk et al. | Oct. 20, 1953 |